H. E. STRATTON.
VEHICLE WHEEL.
APPLICATION FILED DEC. 12, 1911.
1,049,418.
Patented Jan. 7, 1913.
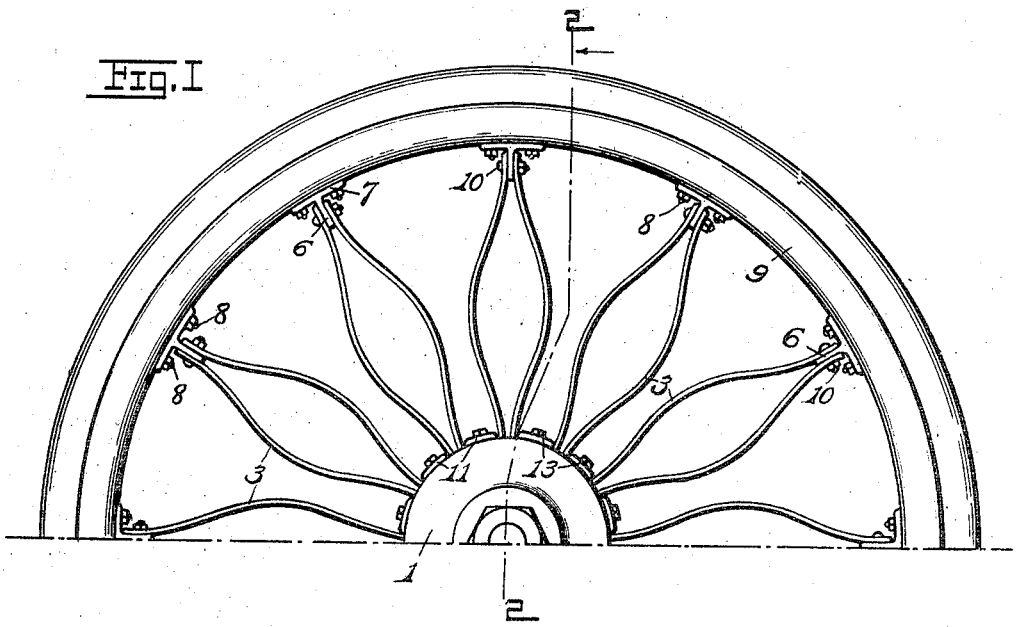
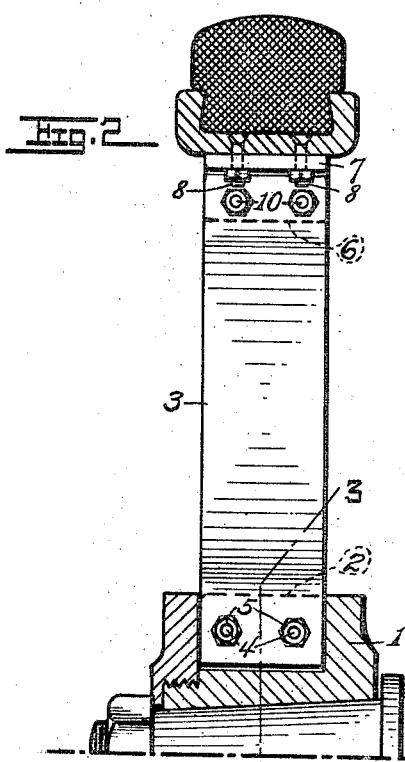
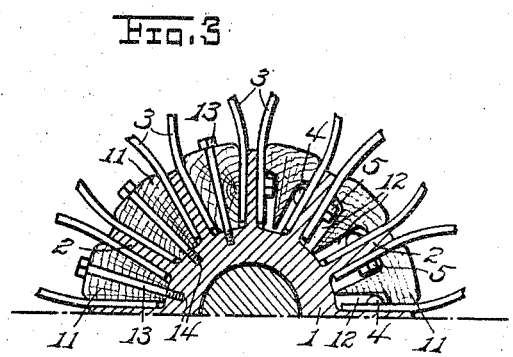
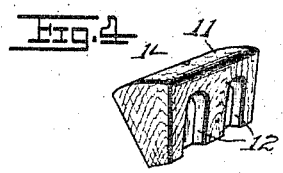
WITNESSES:
J. E. Arthur,
Bruce Morris.
INVENTOR—
Harper E. Stratton
BY
N. E. Dunlap,
ATTORNEY.

UNITED STATES PATENT OFFICE.

HARPER E. STRATTON, OF EMPIRE, OHIO.

VEHICLE-WHEEL.

1,049,418.  Specification of Letters Patent.  Patented Jan. 7, 1913.

Application filed December 12, 1911. Serial No. 665,289.

*To all whom it may concern:*

Be it known that I, HARPER E. STRATTON, a citizen of the United States of America, and resident of Empire, county of Jefferson, and State of Ohio, have invented certain new and useful Improvements in Vehicle-Wheels, of which the following is a specification.

This invention relates broadly to vehicle wheels, and more particularly to a resilient wheel primarily designed for use on automobiles.

The chief object of the invention is to provide a simple, inexpensive and durable wheel which is adapted to effectively absorb road shocks due to travel over rough or uneven surfaces thereby making it possible to dispense with the usual pneumatic tire.

A further object is to provide a wheel embodying resilient metal spokes which are so mounted that they may be conveniently removed and replaced when occasion requires, as in case of breakage when on the road, using only an ordinary wrench. And a still further object within the contemplation of the invention is to provide a wheel of the character mentioned the parts of which shall have but little, if any, frictional movement upon each other and which, consequently, are subject to but little wear, thus effectually preventing rattling of any of said parts.

With these and other objects in view, the invention consists in the features of construction, arrangement of parts and combinations of elements which will hereinafter be exemplified, reference being had to the accompanying drawings, forming a part of this specification, in which—

Figure 1 is a side elevation of a part of a symmetrical wheel; Fig. 2 is a section on the line 2—2, Fig. 1; Fig. 3 is a section taken generally on the line 3—3, Fig. 2, the showing at the left of a central vertical line through said figure being that of a section taken centrally of the hub, and that at the right of such line being that of a section taken laterally of the center to show the slots or recesses in the space-blocks; Fig. 4 is a detail perspective view of a space-block.

Referring to said drawings, in which like designating characters distinguish like parts throughout the several views—1 indicates a metallic hub which may be of any appropriate general type. Said hub has spoke-receiving recesses formed therein which are separated by relatively thin radial longitudinally-extending ribs 2.

Spokes 3 consisting of flat resilient bow-shaped strips of metal, preferably spring steel, are arranged in oppositely disposed pairs which have their inner ends received in adjacent recesses in the hub and against the opposite faces of the ribs 4. Said ends are connected in fixed relation to each other and to the hub by means of bolts 4 directed through said ends and through said intervening rib 2. The outer ends of the spokes composing a pair are received against the opposite faces of the radially directed stem 6 of a substantially T-shaped plate or casting 7, being secured to said stem by means of bolts 10, as shown. The castings 7 are rigidly attached to the rim or felly 9 by means of bolts 8.

Wedge-shaped blocks 11, preferably of wood, are mounted in the recesses in the hub to fill up the spaces intervening between adjacent pairs of spokes, as is clearly shown in Fig. 3. Said blocks have grooves 12 in their opposite faces for the reception of the heads and nuts carried by the bolts 4, the grooves of each block extending along said faces from the inner edge of the block to a point which will just allow of the insertion of the block to seating position without encountering interference from said heads and nuts. For securing said blocks in position tap-bolts 13 are directed through the blocks and have their ends threaded into sockets 14 provided therefor in the hub. Said blocks 11 perform, first, the function of preventing dirt, mud and the like from collecting in said recess; second, the function of preventing the nuts 5 from working off the bolts 4, and, third, the function of strengthening or supporting the inner ends of the spokes, forming bearings for the latter.

The spokes being of bow shape and arranged in pairs with the concave faces thereof disposed in facing relation, it will be obvious that a readily yielding connection is afforded between the hub and rim which effectively absorbs the shocks incident to travel over uneven surfaces.

The removal and replacement of a spoke may be readily accomplished by the use only of an ordinary wrench. To effect the removal, the two blocks 11 located on opposite sides of the pair, of which the spoke which it is desired to replace constitutes a part, are removed by withdrawing the corresponding bolts 13 from their sockets 14; then the bolts 4 and bolts 8 which hold the spoke in place are removed, whereupon the spoke may be withdrawn, and a new one substituted.

Since both ends of each spoke are rigidly held in place it is obvious that all frictional movement which would tend to produce wear and resultant rattling is eliminated.

Having thus described my invention, what I claim as new, and desire to secure by Letters Patent, is—

1. A vehicle wheel comprising a hub having recesses formed in its periphery, said recesses being separated by radially directed ribs, resilient bow-shaped spokes arranged in pairs and having their inner ends received in said recesses and bolted to said ribs, a rim, means for attaching the outer ends of the spokes to said rim, and recessed wedge-blocks interposed in the recesses in the hub between adjacent spokes.

2. A vehicle wheel comprising a hub having recesses formed in its periphery, said recesses being separated by radially directed ribs, resilient bow-shaped spokes arranged in pairs and having their inner ends received in said recesses and bolted to said ribs, a rim, T-shaped plates attached to said rim, the outer ends of the spokes of each pair being bolted against opposite faces of the stem of a plate, and wedge-shaped blocks having grooves in their opposite faces mounted in the recesses in the hub between adjacent spokes.

3. A vehicle wheel comprising a hub having recesses formed in its periphery, said recesses being separated by radially directed ribs, resilient bow-shaped spokes arranged in pairs in oppositely facing relation, the inner ends of the spokes composing each pair being received in adjacent recesses in the hub against opposite faces of the intervening rib, bolts securing said ends to said rib, a rim, members secured to said rim and having radially directed stems, the outer ends of the spokes composing each pair being bolted to said stem against its opposite faces, and means interposed between adjacent pairs of spokes for preventing the collection of foreign matter in the recesses in the hub, said means being adapted for insertion without interference from the first above-mentioned bolts.

4. A vehicle wheel comprising a hub having recesses formed in its periphery, said recesses being separated by radially directed ribs, resilient bow-shaped spokes arranged in pairs in oppositely facing relation, the inner ends of the spokes composing each pair being received in adjacent recesses in the hub against opposite faces of the intervening rib, bolts securing said ends to said rib, a rim, members secured to said rim and having radially directed stems, the outer ends of the spokes composing each pair being bolted to said stem against its opposite faces, and recessed wedge-blocks seated in the recesses in the hub between adjacent spokes.

In testimony whereof I affix my signature in presence of two subscribing witnesses.

HARPER E. STRATTON.

Witnesses:
H. E. DUNLAP,
BRUCE MORRIS.

---

Copies of this patent may be obtained for five cents each, by addressing the "Commissioner of Patents, Washington, D. C."